May 23, 1939.  P. W. KOCH  2,159,703
RATE OF CLIMB INDICATOR
Filed Jan. 4, 1937    2 Sheets-Sheet 2
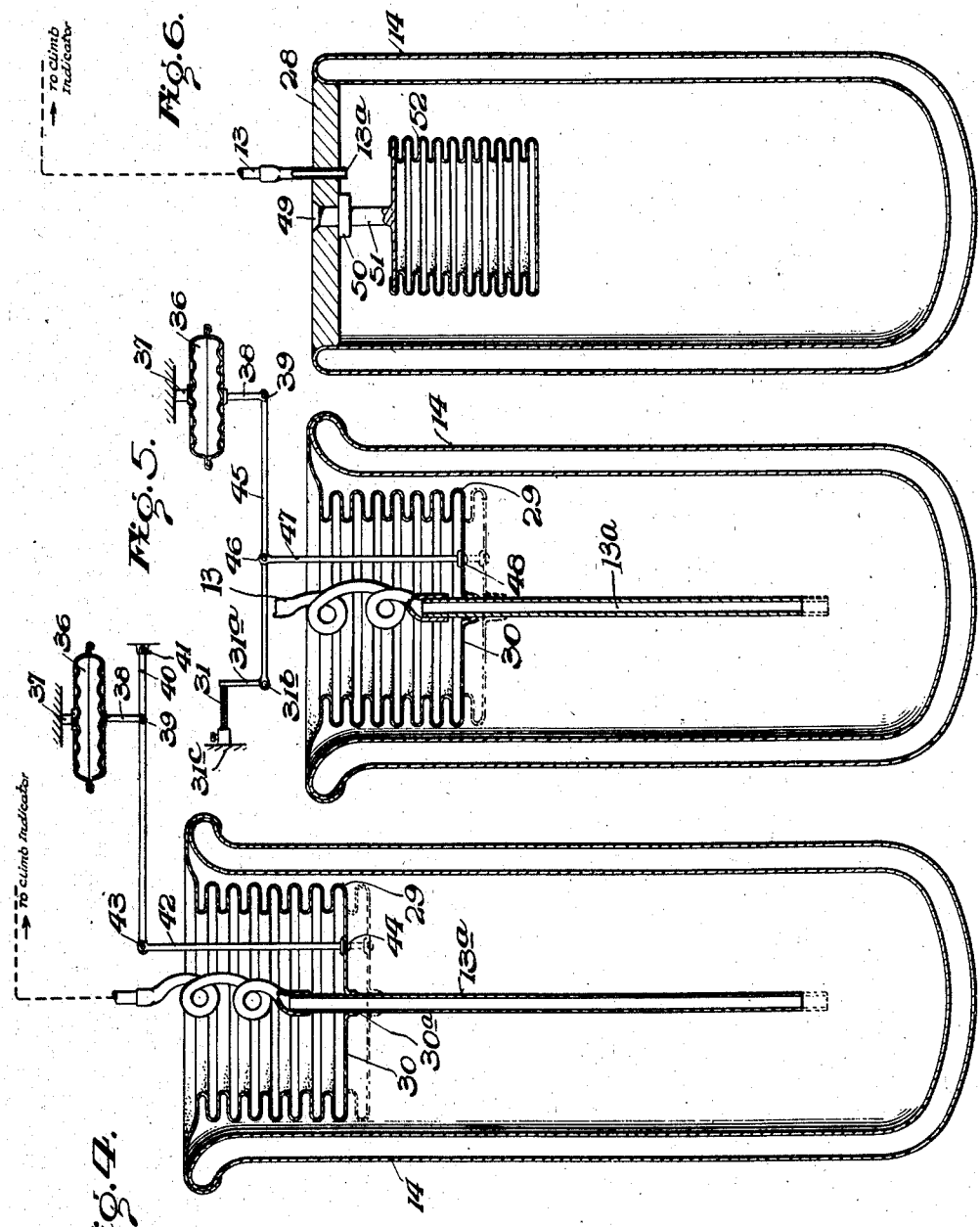

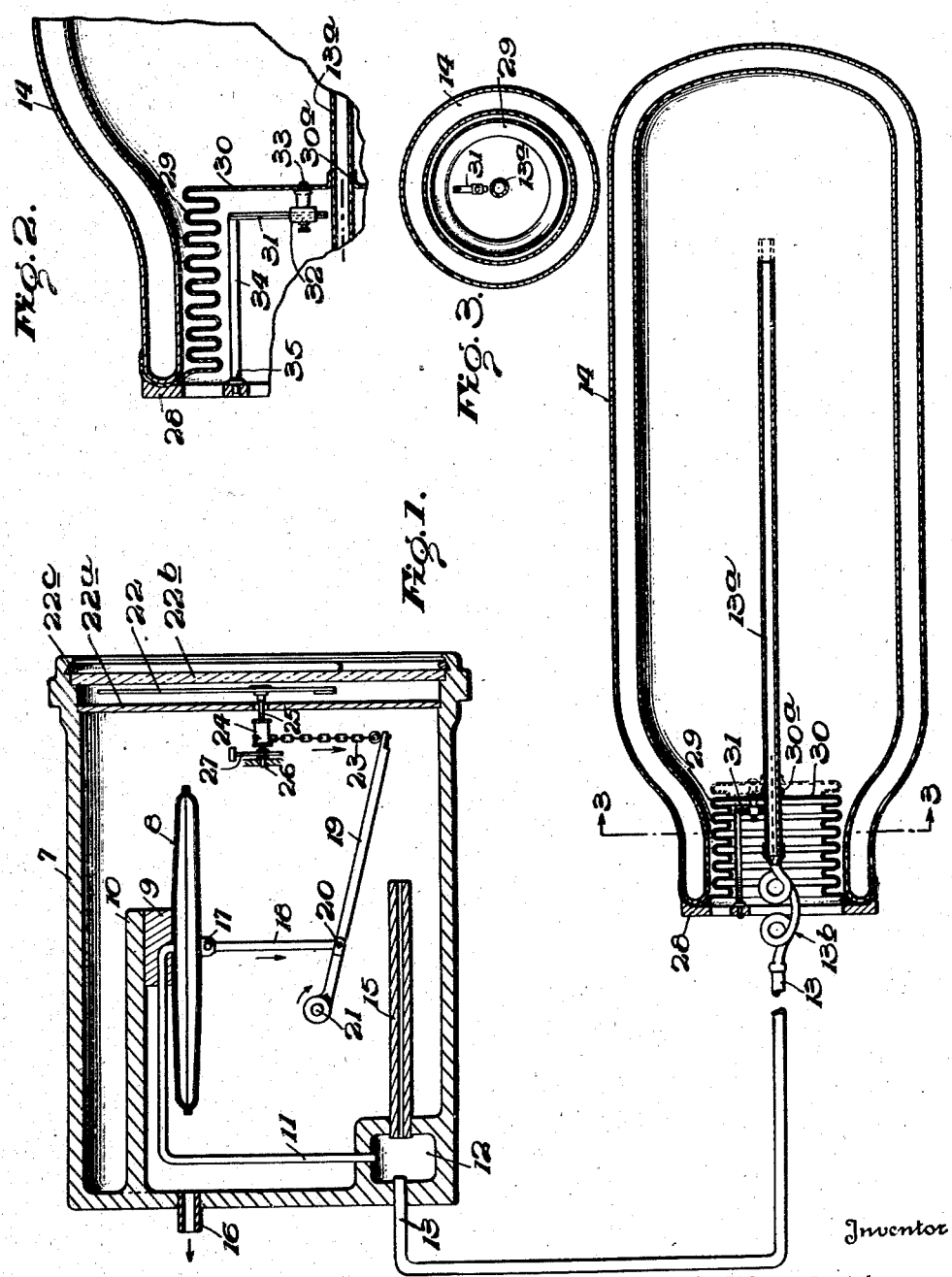

Patented May 23, 1939

2,159,703

UNITED STATES PATENT OFFICE 2,159,703

RATE OF CLIMB INDICATOR

Paul W. Koch, Brooklyn, N. Y., assignor to Bendix Aviation Corporation, South Bend, Ind., a corporation of Delaware Application January 4, 1937, Serial No. 119,045

10 Claims. (Cl. 264—1)

The present invention relates to pressure responsive indicating instruments and more particularly to pressure responsive instruments such as aircraft rate of climb indicators, for example, wherein a differential pressure is utilized to actuate an indicating element to indicate the rate of change of altitude.

The invention is embodied in an aircraft rate of climb indicator wherein a differential pressure is established due to a change in altitude and wherein means are provided to equalize said pressure when the altitude ceases to change.

More specifically, the rate of climb indicator embodying the invention is provided with novel means for regulating the volume of air available to produce the differential pressure and thereby regulating the rate of equalization of said pressure in order to provide compensation for certain conditions.

Rate of climb indicators of the prior art have been provided with means for equalization of the differential pressure such, for example, as a capillary tube or restricted passage, but no means were provided whereby inaccuracies due to changes in certain conditions of the atmosphere could be compensated, as, for example, due to changes in temperature or barometric pressure or both.

Upon an increase in temperature above the normal temperature at which the rate of climb indicator is calibrated, the air encounters greater difficulty in flowing through the capillary or restricted passage, thereby maintaining the differential pressure for a greater period of time than at the normal temperature, thus giving an indication of too high a rate of climb. Conversely, upon a decrease in temperature below the normal temperature, the air flows more freely through the capillary passage, thereby maintaining the differential pressure for a shorter period of time than at the normal temperature, thus giving an indication of too low a rate of climb.

Upon an increase in altitude above sea level the air becomes rarified. This rarified air also encounters greater difficulty in flowing through the capillary or restricted passage and, therefore, the device gives an indication of too high a rate of climb.

Accordingly, one of the objects of the present invention is to provide, in an instrument of the class described novel means whereby the foregoing undesirable characteristics are eliminated.

Another object is to provide a novel rate of climb indicator in which the errors due to changes in certain conditions of the atmosphere, such as temperature and pressure changes due to changes in altitude, are compensated.

Another object is to provide, in a rate of climb indicator of the type including an air reservoir, novel means including means responsive to changes in a condition of the atmosphere for varying the effective volume of said air reservoir to compensate said indicator for errors due to such changes.

Another object of the present invention is to provide, in a rate of climb indicator of the type having an air reservoir, novel means whereby the pressure equalization is controlled by varying the volume of the air reservoir in response to changes in temperature.

A still further object of the present invention is to provide, in a rate of climb indicator of the type having an air reservoir, novel means whereby the pressure equalization is controlled by varying the volume of the air reservoir in response to changes in altitude.

Still another object of the present invention is to provide, in a rate of climb indicator of the class described, including a pressure responsive element and a reservoir, novel means whereby the errors due to changes in a condition of the atmosphere such as temperature and/or pressure are compensated by controlling the volume of the air reservoir in response to temperature and/or barometric pressure whereby the effective volume of said pressure responsive element is controlled.

Other and further objects and advantages of the invention will appear more fully hereinafter from a consideration of the detailed description which follows, taken together with the accompanying drawings wherein are illustrated several embodiments of the invention. It is to be expressly understood, however, that the drawings are for the purpose of illustration only and are not designed as a definition of the limits of the invention, reference being had for this purpose to the appended claims.

In the drawings wherein like reference characters refer to like parts throughout the several views:

Fig. 1 is a side elevation, in section, illustrating one embodiment of the invention;

Fig. 2 is an enlarged detail showing the construction of the temperature actuated bellows;

Fig. 3 is a section taken on line 3—3 of Fig. 1;

Fig. 4 is a side elevation in section illustrating another embodiment of the invention;

Fig. 5 is a side elevation in section with a part omitted to simplify the illustration showing another embodiment of the invention; and Fig. 6 is a side elevation in section illustrating still another embodiment of the invention.

Referring to the drawings and more particularly to Fig. 1, the rate of climb indicator embodying the present invention comprises, as shown, a casing 7 in which is mounted the operating mechanism including a pressure responsive expansible and contractible diaphragm device 8 mounted on a block 9 which is carried by an arm 10 secured to the casing. Leading from the interior of expansible chamber 8 is a tube 11 connected to the coupling chamber 12 and a second tube 13 leading to the thermally insulated tank or reservoir 14 by means of a rigid tube 13a and a flexible coupling tube 13b. The reservoir 14, in the present instance, is a double-walled glass bottle, and the air between the inner and outer walls is evacuated.

Also leading from the coupling chamber 12 is a capillary tube 15 whereby the air from within the diaphragm 8 and the reservoir 14 can escape to the interior of casing 7. The casing 7 is vented to the atmosphere by a vent 16 so that the exterior of diaphragm 8 is subjected to the atmospheric pressure prevailing outside the casing.

Pivotally connected to the diaphragm 8 by central lug 17 is a link 18 which, in turn, is pivotally connected to arm 19 at 20, said arm 19 being fulcrumed at 21. The arm 19 is connected to the pointer 22 moving over dial 22a by means of a chain 23, drum 24 and shaft 25 journaled at 26 and urged in one direction by hair spring 27. The casing is closed at the front by cover glass 22b held in place by resilient split ring 22c.

In Figs. 2 and 3 is illustrated in greater detail the structure of the compensating means whereby the volume of the reservoir is changed to compensate for temperature.

Clamped between plate 28 and reservoir 14 is a bellows 29 carrying disc 30 to which is connected the bi-metallic temperature actuated element 31 by a clamp 32 fastened to disc 30 by rivet 33. Element 31 is held in position by arm 34 fastened to the plate 28 by a rivet 35. Passing through disc 30 at seal 30a is tube 13a.

The operation of the device as shown in Figs. 1 through 3 is as follows: When the instrument is at any given elevation for an extended period of time, air entering vent 16 exerts its pressure on the outside of diaphragm 8. This same air also enters capillary 15 and coupling chamber 12 and thereby enters the reservoir 14 by means of tubing 13, 13a and also the interior of diaphragm 8 by means of tubing 11. The pressures on the inside and the outside of diaphragm 8 are, therefore, equalized and no movement of pointer 22 occurs.

Upon an increase in altitude the pressure of the atmosphere decreases. This decreased pressure immediately finds its way to the outside of diaphragm 8 by means of vent 16. The air inside the diaphragm, however, is practically at the pressure corresponding to the previous altitude, since the pressure or volume of air inside of the diaphragm and reservoir cannot be immediately equalized with the pressure of the air on the outside of diaphragm 8 due to the small size of the capillary hole in element 15 which connects them to the outside of said diaphragm. As long as the altitude continues to increase, the pressure inside the diaphragm remains higher than the pressure outside thereof, the diaphragm is expanded and the pointer 22 indicates a value proportional to the rate of change of altitude.

With a decrease in temperature which usually accompanies an increase in altitude the air escapes from capillary 15 at a higher rate so that diaphragm 8 would collapse too quickly and the pointer would indicate too low a value. To compensate for this the bi-metallic strip 31 moves to the left, as viewed in Figs. 2 and 3, upon a decrease in temperature thereby collapsing the bellows 29 and, hence, increasing the effective volume of reservoir 14. An increase in said volume off-sets the more rapid escape of the air at lower temperature through capillary 15 and, therefore, the bellows 8 does not collapse any more quickly at the lower temperature than at normal temperature. Therefore, the error due to low temperature is compensated.

Upon an increase in temperature the air escapes less readily through capillary 15, diaphragm 8 would normally collapse less quickly and pointer 22 would give an over indication. To compensate for errors occurring at higher temperature, strip 31 moves to the right, as viewed in Figs. 2 and 3, expands bellows 29 and thereby decreases the effective volume of reservoir 14. This decrease in volume compensates for the less rapid flow through 15 at the higher temperature and pointer 22, therefore, indicates properly at the higher temperature.

Referring to Fig. 4, novel means are provided for actuating the bellows 29, whereby the effective volume of the reservoir is changed to compensate for changes in altitude. In the form shown, said means comprise an aneroid capsule 36 fastened at 37 and pivotally connected by link 38 at 39 to a lever 40 fulcrumed at 41. Lever 40 is pivotally connected to one end of a link 42 by pivot 43 while the other end of link 42 is riveted to disc 30 of the bellows 29 by rivet 44.

Upon an increase in altitude the air becomes rarified and escapes less readily from the capillary 15, thereby maintaining diaphragm 8 expanded for a greater period of time and giving an over indication by pointer 22. To compensate for the over indication, aneroid 36 expands at the higher altitude, moves lever 40 downward, as viewed in Fig. 4, to actuate link 42 downwardly thereby expanding bellows 29 and decreasing the effective volume of reservoir 14. This decrease in volume compensates for the less rapid flow of air through capillary 15 at higher altitudes and thereby the collapse of diaphragm 8 is accelerated to correct its previous slow collapse and pointer 22 indicates properly. Upon a decrease in altitude the reverse operation occurs. The air being more dense at lower altitude it escapes more readily through 15. This would collapse diaphragm 8 prematurely, giving an under indication by pointer 22. However, aneroid 36 is collapsed at lower altitudes, lifts link 42 to collapse bellows 29 whereby the volume of reservoir 14 is increased. Diaphragm 8 thereby collapses less quickly and pointer 22 gives a correct indication.

In Fig. 5 is illustrated a device compensating for both temperature changes and pressure changes due to change in altitude. In this figure, aneroid 36 is fastened at 37 as in Fig. 4, and is connected by link 38 and pivot 39 to lever 45 at one end thereof while to the other end of said lever 45 is connected the bi-metallic element 31 by means of link 31a and pivot 31b. Element 31 is fastened at 31c. Connected to lever 45 at pivot 46 is link 47 which is connected at its other end to disc 30 of bellows 29 by rivet 48. With an increase in temperature element 31 moves downwardly, to move lever 45 and link 47 and expand the bellows 29 to decrease the effective volume in reservoir 14 to thereby compensate for the increase in temperature. With an increase in altitude, the aneroid 36 expands, moves lever 45 and link 47 to expand the bellows 29 and thereby decrease the effective volume of reservoir 14. Hence, at either increased temperature or increased altitude, both of which would normally give an over reading of the pointer, the volume of the reservoir 14 is decreased to make the pointer indicate properly.

Upon a decrease in temperature or a decrease in altitude the bellows 29 is contracted to increase the volume of reservoir 14 and thereby compensate for the under reading due to decrease in temperature or altitude. An increase in temperature and a decrease in altitude will tend to move link 45 in opposite directions and reduce the movement of the bellows but as an increase in temperature and a decrease in altitude produces opposing errors this is as desired. Hence, errors due to temperature or altitude changes, or both, are compensated for by the device of Fig. 5.

In Fig. 6 is illustrated a device for producing the results produced by the device of Fig. 5. In this figure a bellows 52 is filled with a gas at normal temperature and pressure, in the present instance atmospheric air being used. This bellows is suspended by rod 51 riveted at 49 to plate 28 and abutting the under side of said plate with flange 50. Upon an increase in temperature of the air inside the reservoir the air inside of bellows 52 will expand to decrease the volume in the reservoir 14 as would an increase in temperature in Figs. 1, 2 and 5. Also upon an increase in altitude the pressure of the air inside the reservoir decreases and the bellows 52 will expand to decrease the volume of the reservoir 14 as would an increase in altitude in Figs. 4 and 5. Upon a decrease in temperature or a decrease in altitude the volume of reservoir 14 will be increased by a collapse of bellows 52. Therefore, either temperature or pressure changes or changes in both temperature and pressure will be compensated by the device of Fig. 6.

There have, therefore, been provided novel means whereby errors due to temperature and/or pressure changes in a rate of climb instrument are compensated in a novel and simple manner.

Although several embodiments of the invention have been illustrated and described, further changes and modifications in form, materials and relative arrangement of parts, which will now appear to those skilled in the art, may be made without departing from the scope of the invention. Reference is, therefore, to be had to the appended claims for a definition of the limits of the invention.

What is claimed is:

1. In an instrument of the class described having a pressure chamber, a reservoir connected to said chamber, means providing a restricted passage between the inside and outside of said chamber, and means responsive to changes in altitude atmospheric pressure for regulating the effective volume of said reservoir whereby errors due to changes in flow through said passage with changes in atmospheric pressure are compensated.

2. In an instrument of the class described having a pressure chamber, atmospheric air exerting its pressure on one side of said chamber, a reservoir connected to said pressure chamber, means providing a restricted passage between the inside and outside of said chamber, and means responsive to changes in the air temperature and changes in pressure accompanying changes in altitude for regulating the volume in said reservoir whereby errors due to changes in flow through said passage with changes in temperature and pressure are compensated.

3. In an instrument of the class described, a pressure responsive element, a reservoir connected to said responsive element, capillary means leading from said element to a source of atmospheric pressure, and a gas-filled bellows responsive to changes in temperature and pressure in said reservoir for controlling the effective volume of said reservoir.

4. In a rate of climb indicator, an air pressure responsive element, a reservoir connected thereto, a pointer, means connecting said pointer and said element, capillary means restricting the flow of air from said element, means exclusive of said element for regulating the effective volume of said reservoir and means responsive to the air temperature so controlling said volume regulating means that the effective volume of said reservoir is decreased with increase in temperature.

5. In a rate of climb indicator, a casing, means communicating said casing with the atmosphere, a movable indicator in said casing, an expansible diaphragm in said casing, operating means connecting said diaphragm and said indicator for operating the latter by the former, a reservoir containing air and having communication with the interior of said diaphragm, capillary means having connection to said diaphragm and said reservoir for providing restricted communication between the interior of said diaphragm and the atmosphere through said casing, and means responsive to changes in the pressure of the atmosphere for regulating the effective volume of said reservoir to compensate for errors in the indicator due to such changes.

6. In a rate of climb indicator, a movable wall subject to atmospheric pressure on one side thereof, means for retarding the rate at which pressure on the other side of said movable wall tends to become equal to a changing atmospheric pressure due to changes in altitude, a reservoir containing air and having communication with the atmosphere through said retarding means, indicating means actuated by said movable wall in accordance with the rate of change of altitude, and means responsive to changes in the air temperature and to changes in barometric pressure for regulating the volume of said reservoir to produce a compensating effect for errors produced in said indicating means due to variations in flow through said retarding means caused by temperature and pressure changes so that the indicating means will give true indications irrespective of changes in temperature and barometric pressure.

7. In a device of the character described, a movable wall subject to atmospheric pressure on one side thereof, means for controlling the rate at which pressure on the other side thereof tends to become equal to a changing atmospheric pressure due to changes in altitude, a reservoir, containing air and having communication with the atmosphere through said controlling means, means for altering the effective volume of said reservoir, and means responsive to temperature and pressure changes of said air for actuating said volume altering means.

8. In a device of the character described, a movable wall subject to atmospheric pressure on one side thereof, means for controlling the rate at which pressure on the other side thereof tends to become equal to a changing atmospheric pressure due to changes in altitude, a reservoir, containing air and having communication with the atmosphere through said controlling means, means for altering the effective volume of said reservoir, and means responsive to temperature and pressure changes of said air for controlling said altering means, said temperature changes actuating said altering means to decrease said effective volume upon an increase in the effective value of the temperature and said pressure changes actuating said altering means to increase said effective volume upon an increase in effective value of the pressure.

9. In a device of the character described, a movable wall subject to atmospheric pressure, on one side thereof, means for controlling the rate at which pressure on the other side thereof tends to become equal to a changing atmospheric pressure due to changes in altitude, a reservoir, containing air and having communication with the atmosphere through said controlling means, means for altering the effective volume of said reservoir, and means responsive to changes in the air temperature for controlling said altering means, an increase in temperature so controlling said altering means as to decrease said effective volume.

10. In a device of the character described, a movable wall subject to atmospheric pressure, on one side thereof, means for controlling the rate at which pressure on the other side thereof tends to become equal to a changing atmospheric pressure due to changes in altitude, a reservoir, containing air and having communication with the atmosphere through said controlling means, and means responsive to changes in the air pressure for altering the effective volume of said reservoir.

PAUL W. KOCH.